United States Patent [19]
Tuttle

[11] Patent Number: 5,300,875
[45] Date of Patent: Apr. 5, 1994

[54] PASSIVE (NON-CONTACT) RECHARGING OF SECONDARY BATTERY CELL(S) POWERING RFID TRANSPONDER TAGS

[75] Inventor: John R. Tuttle, Corrales, N. Mex.

[73] Assignee: Micron Technology, Inc., Boise, Id.

[21] Appl. No.: 894,879

[22] Filed: Jun. 8, 1992

[51] Int. Cl.$^5$ .............................................. H02J 7/00
[52] U.S. Cl. ......................................... 320/20; 320/23
[58] Field of Search ................. 320/61, 62, 64, 68, 320/20, 21, 22, 23, 24, 31, 32, 39, 40

[56] References Cited

U.S. PATENT DOCUMENTS

| | | | |
|---|---|---|---|
| 4,684,870 | 8/1987 | George et al. | 320/20 |
| 4,992,720 | 2/1991 | Hata | 320/23 |
| 5,130,634 | 7/1992 | Kasai | 320/22 |

*Primary Examiner*—Kristine L. Peckman
*Attorney, Agent, or Firm*—David J. Paul

[57] ABSTRACT

A concept of passively recharging the battery of battery backed electronic circuits and in particular utilizing these methods to recharge an RFID transponder's secondary cell(s). The invention particularly relates to battery backed transponders which contain rechargeable batteries wherein the recharging circuitry of the present invention allows for passive (non-contact) recharging of a battery residing in a transponder unit that may or may not be directly accessible for handling. The passive recharging strategies disclosed include utilizing energy sources such as: 1) a radio frequency (rf) signal generated outside the package; 2) a seismic geophone; 3) seismic piezoelectric accelerometers; 4) photovoltaic cells located outside of the transponder package; 5) infrared p-v cells located inside of the package driven by the heated package; and/or 5) acoustic energy (sonic and ultrasonic) coupled to the recharging circuitry via an acoustic transducer.

28 Claims, 1 Drawing Sheet

PASSIVE (NON-CONTACT) RECHARGING OF SECONDARY BATTERY CELL(S) POWERING RFID TRANSPONDER TAGS

FIELD OF THE INVENTION

This invention relates generally to a recharging method of remote battery cells and more specifically to a method of recharging secondary battery cell(s) in radio frequency identification (RFID) devices.

BACKGROUND OF THE INVENTION

The field of RFID systems has evolved over the past years from systems developed in relatively large packages (size of a cigarette package) containing battery powered transmission/receiving circuitry or transponder, such as the identification system disclosed in U.S. Pat. No. 4,274,083, to passive systems (the size of a credit card) in which the transponder receives its power from the base station or interrogator, such as the identification system disclosed in U.S. Pat. No. 4,654,658.

Although, an inexpensive low-power RFID system having a battery powered transponder allows for greater distance between the interrogator and the transponder units, the physical size of the transponder unit has pushed the industry towards the passive transponder technology as disclosed in U.S. Pat. Nos. 4,654,658 and 4,730,188. However, the limit in RF communication distance between transponder an interrogator in passive systems is in the 2 foot or less range if reasonable accuracy of information collected is to be achieved.

U.S. Pat. No. 4,724,427 discloses a passive RFID transponder as well as a hybrid battery operated version which addresses both types of RFID systems.

The memory used in RFID systems depends on the type of system used wherein, most passive systems use a programmable read only memory (PROM) of some sort that will retain its programmed data even when power is disrupted or removed while a battery packed system may use any memory type, including random access memory (RAM), that requires a continuous power source to retain programmed data.

It is most desirable to use battery based transponder systems to gain communication range between the transponder and interrogator. If the battery is rechargeable, so much more the better. The present invention discloses various methods to recharge battery cell(s) of battery backed electronic systems and more particularly to recharge an RFID transponder's secondary cell(s) that may be situated in a remote location. Also, all U.S. patents cited herein are hereby incorporated by reference.

SUMMARY OF THE INVENTION

The present invention introduces various methods to recharge battery backed electronic circuits and in particular utilizing these methods to recharge an RFID transponder's secondary cell(s).

The invention particularly relates to battery backed transponders which contain rechargeable batteries. The present invention allows for passive (non-contact) means to recharge a battery residing in a transponder unit that may or may not be directly accessible for handling. The passive recharging methods disclosed include: 1) rectifying a radio frequency (rf) signal that is generating from outside the package; 2) using a seismic geophone as a power source; 3) using seismic piezoelectric accelerometers as a power source; 4) using photo- voltaic cells on the outside of the transponder package; 5) using infrared photovoltaic cells on the inside of the package driven by the heated package; and 6) using acoustic energy (sonic and ultrasonic) coupled via the package to an acoustic transducer.

DETAILED DESCRIPTION OF THE PREFERRED EMBODIMENTS

Figure 1:
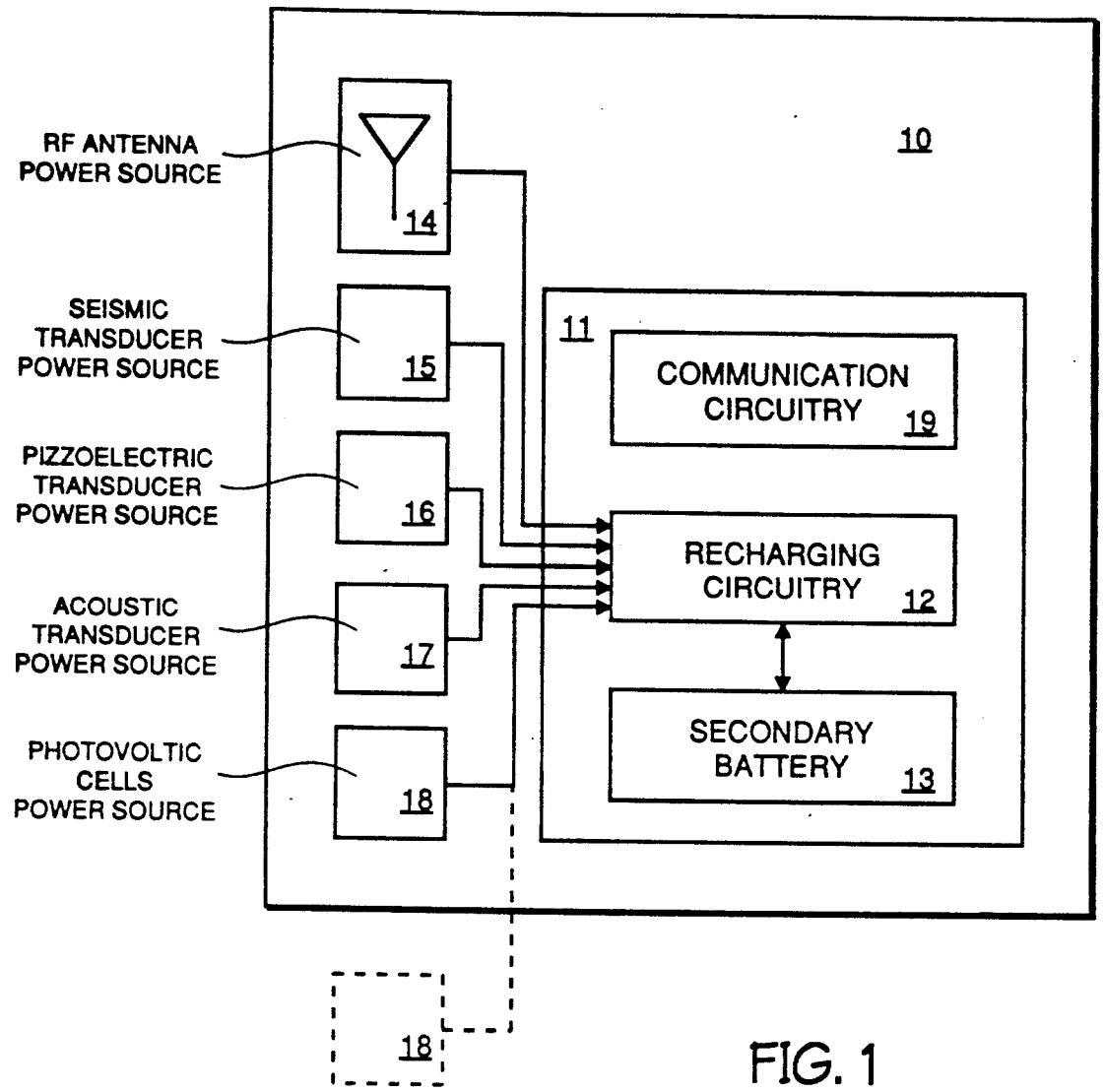
FIG. 1 shows a block diagram representing the various power sources utilized by the present invention to recharge a secondary battery.

Referring now to FIG. 1, a radio frequency identification (RFID) package 10 is depicted comprising an RFID integrated circuit 11 (or simply RFID tag), antenna(s) 14, seismic transducer 15, piezoelectric transducer 16, acoustic transducer 17 and photovoltaic cells 18, each of which may also contain passive and/or low-power active circuits such as transformers, resistors and capacitors to condition the transducer outputs to match the input requirements of the recharging circuitry. The RFID I.C. contains conventional communication circuitry 19 known to those skilled in the art and is therefore not discussed herein, however additional recharging circuitry 12 and secondary battery 13 is shown in response to the present invention.

As FIG. 1 shows, antenna(s) 14, seismic transducer 15, piezoelectric transducer 16, acoustic transducer 17 or photovoltaic cells 18 are used to either receive energy from a generating source or transmit energy and couples that energy to recharging circuitry 12. All of the transducers, (15, 16 and 17) are capable of generating and transmitting their own energy which will prove advantageous to the present invention. Any one of the above mentioned devices or any combination thereof may be used to present energy in the form of an a.c. or d.c. voltage to recharging circuitry 12. Recharging circuitry 12 then processes the energy received and provides it to secondary battery (or batteries, but referred to hereinafter as battery for example purposes) 13 as a trickle charging source.

Figure 2:
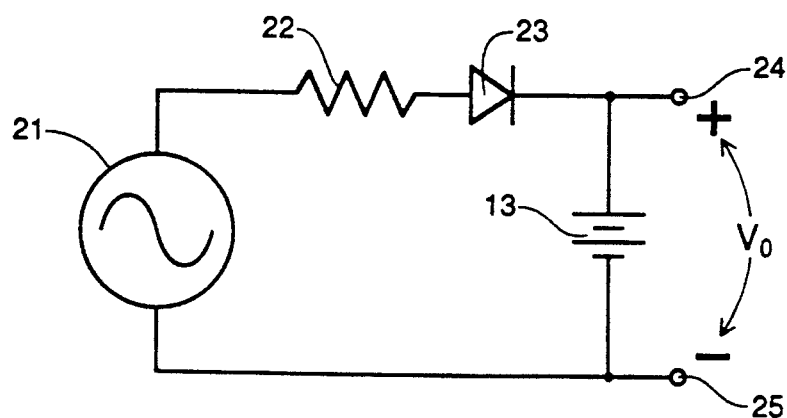
FIG. 2 depicts a typical recharging circuit that may be utilized with one of the various power sources of FIG. 1.

A typical recharging circuitry is depicted in FIG. 2 that may be used for receiving an a.c. voltage source 21 (again, from at least one of the energy receiving devices 14, 15, 16, 17 and 18) wherein the a.c. current developed is limited by current limiting resistor 22, rectified by diode 23 and developed across terminals 24 and 25 of secondary battery 13 for trickle charging.

Referring back to FIG. 1, each voltage source receiver must receive its power from a power generating source or generate its own. Referring to antenna(s) 14, typically an rf transceiver base unit would transmit an rf signal for communication proposes. One could intentionally use this source directly for periodically recharging the secondary battery during non-communication intervals. Alternately, a simple rf generating device known to those skilled in the art may be used to generate an rf voltage that is solely used for recharging purposes.

Referring now to seismic transducer 15, a seismic geophone (such as a magnet-on-spring bouncing inside a coil) may be used to create a power source that is received by seismic transducer 15. Transducer 15 then in turn generates a voltage that is presented to recharging circuitry 12 and the process continues as described above. The seismic geophone used could also be a separate unit located in close proximity to RFID package 10.

Referring now to piezoelectric transducer 16, energy is received from a source such as a seismic piezoelectric accelerometer. Transducer 16 then in turn generates a voltage that is presented to recharging circuitry 12 and the process continues as described above. The seismic piezoelectric accelerometer may be directly attached to RFID package 10 or in a separate unit located in communicable proximity to RFID package 10.

Referring now to acoustic transducer 17, acoustic energy (say ultrasonic waves) is received by transducer 17. Though an acoustic transducer is preferred for receiving acoustic energy, and is an electromagnetic form of an ultrasonic transducer, other ultrasonic transducers that may be used include piezoelectric, electrostatic, and magnetostrictive devices. In fact, any of these ultrasonic transducers may be used to generate an ultrasonic wave that would be detected by transducer 17. Transducer 17 then in turn generates a voltage that is presented to recharging circuitry 12 and the process continues as described above.

Referring now to photovoltaic cells 18, these cells are preferably mounted on the exterior of RFID package 10 (as indicated by the dashed lined box 18), or they could be infrared cells fabricated on the inside of RFID package 10 that are driven by heat dissipated by the package. An infrared source for heating the package would then be required. Cells 18 then in turn generate a voltage that is presented to recharging circuitry 12 and the process continues as described above.

It is to be understood that although the present invention has been described in a preferred embodiment, various modifications known to those skilled in the art, may be made without departing from the invention as recited in the several claims appended hereto.

I claim:

1. A radio frequency (RF) transceiver system comprising:
   a) communication circuitry having control logic and memory;
   b) a secondary battery unit for powering said communication circuitry;
   c) a secondary battery trickle charging unit for charging said secondary battery unit; and
   d) a power unit for supplying voltage and current to said secondary battery trickle charging unit, said power unit is selected from the group including a radio frequency receiving antenna system, a seismic transducer, a piezoelectric transducer, photovoltaic cells and an acoustic transducer;
   wherein said communication circuitry, said secondary battery unit, said secondary battery trickle charging unit and said power unit are all combined to form a single radio frequency transceiver package.

2. The RF transceiver system of claim 1 wherein said secondary battery unit comprises a single battery cell.

3. The RF transceiver system of claim 1 wherein said secondary battery unit comprises a plurality of battery cells.

4. The RF transceiver system of claim 1 wherein said photovoltaic cells are located on the outside of the package.

5. The RF transceiver system of claim 1 wherein said photovoltaic cells comprise infrared photovoltaic cells located on the inside of the package.

6. The RF transceiver system of claim 1 wherein said acoustic transducer is a sonic transducer.

7. The RF transceiver system of claim 1 wherein said acoustic transducer is an ultrasonic transducer.

8. The RF transceiver system of claim 7 wherein said ultrasonic transducer is selected from the group including piezoelectric, electrostatic, and magnetostrictive devices.

9. The RF transceiver system of claim 1 wherein said power unit is an a.c. power source.

10. The RF transceiver system of claim 1 wherein said power unit is a d.c. power source.

11. A radio frequency identification (RFID) device comprising:
    a) communication circuitry having controlling logic and memory;
    b) a secondary battery unit for powering said memory;
    c) a secondary battery trickle charging unit for charging said secondary battery; and
    d) a power unit for supplying voltage and current to said secondary battery trickle charging unit, said power unit is selected from the group including a radio frequency receiving antenna system, a seismic transducer, a piezoelectric transducer, photovoltaic cells and an acoustic transducer;
    wherein said communication circuitry, said secondary battery unit, said secondary battery trickle charging unit and said power unit are all combined to form a single radio frequency identification (RFID) package.

12. The RFID device of claim 11 wherein said secondary battery unit comprises a single battery cell.

13. The RFID device of claim 11 wherein said secondary battery unit comprises a plurality of battery cells.

14. The RFID device of claim 11 wherein said photovoltaic cells are located on the outside of the RFID package.

15. The RFID device of claim 11 wherein said photovoltaic cells comprise infrared photovoltaic cells located on the inside of the RFID package.

16. The RFID device of claim 11 wherein said acoustic transducer is a sonic transducer.

17. The RFID device of claim 11 wherein said acoustic transducer is an ultrasonic transducer.

18. The RFID device of claim 17 wherein said ultrasonic transducer is selected from the group including piezoelectric, electrostatic, and magnetostrictive devices.

19. The RFID device of claim 11 wherein said power unit is an a.c. power source.

20. The RFID device of claim 11 wherein said power unit is a d.c. power source.

21. A method for charging of a secondary battery unit in a radio frequency (RF) transceiver package comprising the steps of:
    a) providing power to a secondary battery trickle charging unit by a radio frequency power source;
    b) conditioning said power to match the input requirements of said secondary battery trickle charging unit; and
    c) using said conditioned power for trickle charging said secondary battery unit;

wherein said power is provided by one of the power units selected from the group including a radio frequency receiving antenna system, a seismic transducer, a piezoelectric transducer, photovoltaic cells and an acoustic transducer.

22. A method for charging of a secondary battery unit in a radio frequency (RF) transceiver package comprising the steps of:
  a) providing power to a secondary battery trickle charging unit by a radio frequency power source;
  b) conditioning said power to match the input requirements of said secondary battery trickle charging unit; and
  c) using said conditioned power for trickle charging said secondary battery unit;
  wherein said power is provided by infrared photovoltaic cells located on the inside of the package that are driven by heat dissipated by said package.

23. A method for charging of a secondary battery unit in a radio frequency (RF) transceiver package comprising the steps of:
  a) providing power to a secondary battery trickle charging unit by a radio frequency power source;
  b) conditioning said power to match the input requirements of said secondary battery trickle charging unit; and
  c) using said conditioned power for trickle charging said secondary battery unit; 'wherein said power is provided by a power unit located on the inside of the package.

24. A method for charging of a secondary battery unit in a radio frequency (RF) transceiver package comprising the steps of:
  a) providing power to a secondary battery trickle charging unit by a radio frequency power source;
  b) conditioning said power to match the input requirements of said secondary battery trickle charging unit; and
  c) using said conditioned power for trickle charging said secondary battery unit;
  wherein said power is provided by a power unit located on the outside of the package.

25. A method for charging of a secondary battery unit in a radio frequency identification (RFID) package comprising the steps of:
  a) providing power to a secondary battery trickle charging unit by a radio frequency power source;
  b) conditioning said power to match the input requirements of said secondary battery trickle charging unit; and
  c) using said conditioned power for trickle charging said secondary battery unit;
  wherein said power is provided by one of the power units selected from the group including a radio frequency receiving antenna system, a seismic transducer, a piezoelectric transducer, photovoltaic cells and an acoustic transducer.

26. A method for charging of a secondary battery unit in a radio frequency identification(RFID) package comprising the steps of:
  a) providing power to a secondary battery trickle charging unit by a radio frequency power source;
  b) conditioning said power to match the input requirements of said secondary battery trickle charging unit; and
  c) using said conditioned power for trickle charging said secondary battery unit;
  wherein said power is provided by infrared photovoltaic cells located on the inside of the package that are driven by heat dissipated by said package.

27. A method for charging of a secondary battery unit in a radio frequency identification (RFID) package comprising the steps of:
  a) providing power to a secondary battery trickle charging unit by a radio frequency power source;
  b) conditioning said power to match the input requirements of said secondary battery trickle charging unit; and
  c) using said conditioned power for trickle charging said secondary battery unit;
  wherein said power is provided by a power unit located on the inside of the package.

28. A method for charging of a secondary battery unit in a radio frequency identification (RFID) package comprising the steps of:
  a) providing power to a secondary battery trickle charging unit by a radio frequency power source;
  b) conditioning said power to match the input requirements of said secondary battery trickle charging unit; and
  c) using said conditioned power for trickle charging said secondary battery unit;
  wherein said power is provided by a power unit located on the outside of the package.

* * * * *